Oct. 31, 1967 F. F. FERRARY 3,350,115
BICYCLE COUPLING DEVICE
Filed Feb. 4, 1966 2 Sheets-Sheet 1

INVENTOR.
FERDINAND F. FERRARY

ATTORNEY

Oct. 31, 1967        F. F. FERRARY                3,350,115
                  BICYCLE COUPLING DEVICE
Filed Feb. 4, 1966                              2 Sheets-Sheet 2

INVENTOR.
FERDINAND F. FERRARY
BY
*R A Joel*
ATTORNEY

United States Patent Office 3,350,115
Patented Oct. 31, 1967

3,350,115
BICYCLE COUPLING DEVICE
Ferdinand Francis Ferrary, Springdale, Conn., assignor to American Machine & Foundry Company, a corporation of New Jersey
Filed Feb. 4, 1966, Ser. No. 525,079
13 Claims. (Cl. 280—209)

The present invention relates to devices for coupling two bicycles together for simultaneous operation in side-by-side relation, and more particularly to a coupling device which permits two bicycles to be operated as a unit while preserving the feel and riding qualities of the uncoupled single bicycles.

Various devices have been heretofore proposed for connecting two bicycles together in side-by-side relationship so that they may be operated and moved in unison as one machine. The prior art devices, however, have not been entirely satisfactory for several reasons. Some such devices, for example, employ rigid members rigidly connected to the respective bicycles to form a unitary four wheeled vehicle. When coupled bicycles having rigid connections are operated over irregular surfaces, they are effectively restrained from movement relative to each other, and consequently undesirable forces may be created and transmitted to the respective bicycle frames. Moreover, when such a rigidly connected unit is turned along a curved path, the bicycles are constrained to remain upright, rather than leaning into the turn as in normal single bicycle operation, and consequently the coupled bicycles lack the feel and riding qualities of a singly operated bicycle.

In an attempt to overcome these objectionable features of rigidly coupled bicycles, coupling devices including resilient members have also been proposed. However the coupling devices having resilient or spring members heretofore proposed have been relatively complex, and generally have imparted to the coupled bicycles an insufficient degree of freedom of relative movement in the desired directions and an insufficient degree of restraint against relative movement in other directions, with the result that they failed to impart to the coupled bicycles the desired feel and riding qualities of a singly operated bicycle. Moreover, in some cases the resilient connecting members tended to introduce a degree of instability to the operation of the coupled bicycles.

Accordingly an object of the present invention is to provide a bicycle coupling device which overcomes the aforementioned shortcomings of prior art devices.

Another object is to provide such a device which allows the coupled bicycles to be operated as a unit while preserving to a substantial degree the ride and feel of the uncoupled individually operated bicycles.

Another object is to provide such a device which maintains corresponding parts of the coupled bicycles in parallel relation during all operating conditions and maneuvers.

Another object is to provide such a device which yieldingly connects the two bicycles while preventing them from advancing or receding relative to one another.

Another object is to provide such a device which permits the coupled bicycles to lean in unison on turns and to vertically move relative to one another when operated over irregular surfaces.

A further object is to provide such a device by which the coupled bicycles are spring biased to the normal upright position.

Yet a further object is to provide such a device which can be detachably connected to two bicycles for operation as a coupled unit and easily removed to permit the bicycles to be operated individually.

Still a further object is to provide such a device which is simple in construction and relatively inexpensive to manufacture.

Numerous other objects and advantages of the invention will be apparent as it is better understood from the following description, which taken in connection with the accompanying drawings, discloses a preferred embodiment thereof.

Referring to the drawings.

Figure 4:
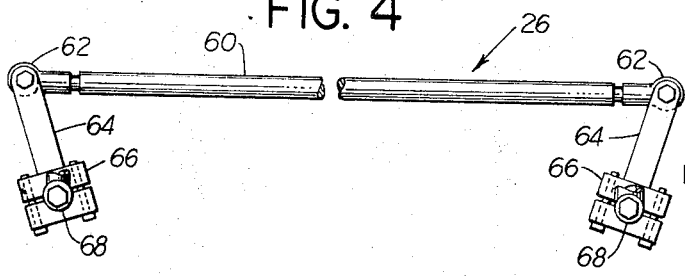
Figure 5:
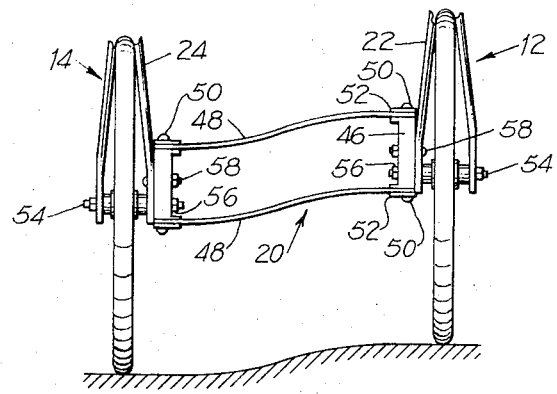
Figure 6:
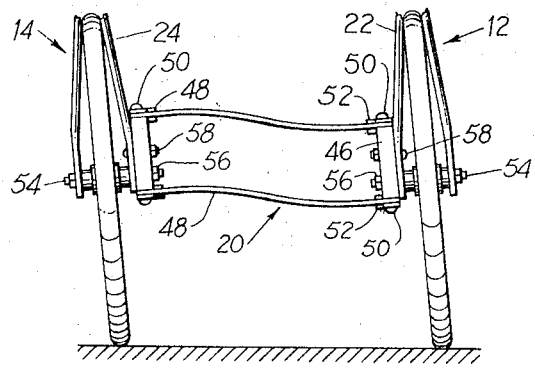

FIGURE 4 is an enlarged plan view of the steering linkage portion of the coupling device when the front wheels of the coupled bicycles are in alignment with the longitudinal axes of the bicycles; and FIGURES 5 and 6 are partial rear views of the coupled bicycles showing the deflection of the spring connecting portion of the coupling device when the coupled bicycles are traveling on an uneven surface and around a curve respectively.

Figure 1:
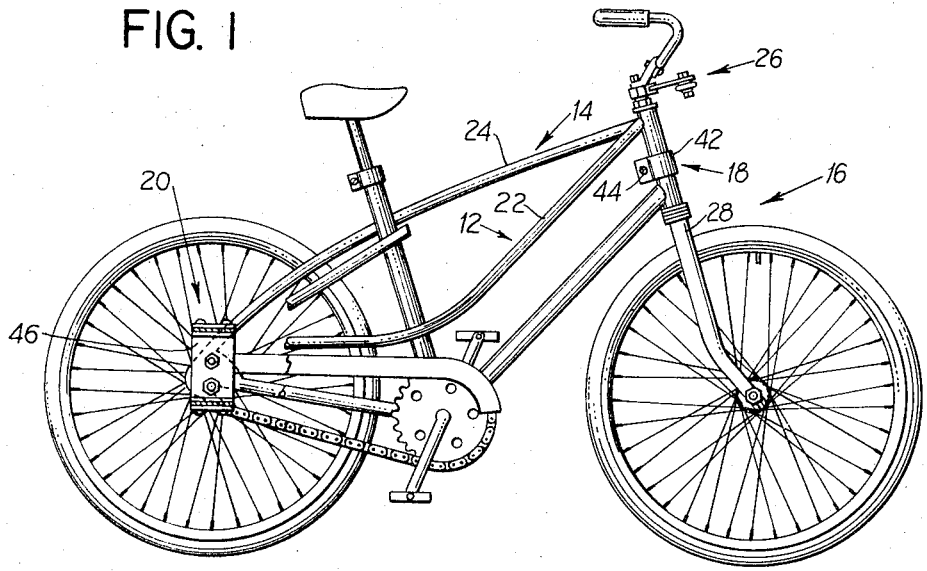
FIGURE 1 is a side view with parts broken away showing a girl's and a boy's type bicycle detachably connected together by the coupling device of the present invention.
Figure 2:
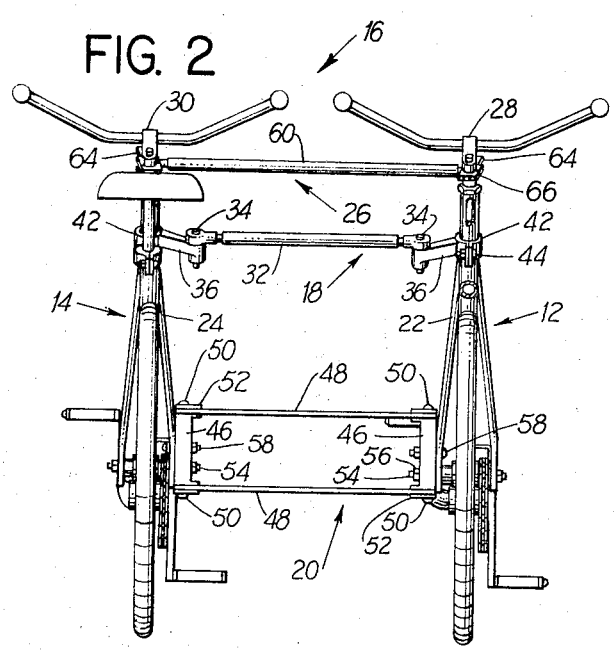
FIGURE 2 is a rear elevational view with parts broken away of the coupled bicycles.
Figure 3:
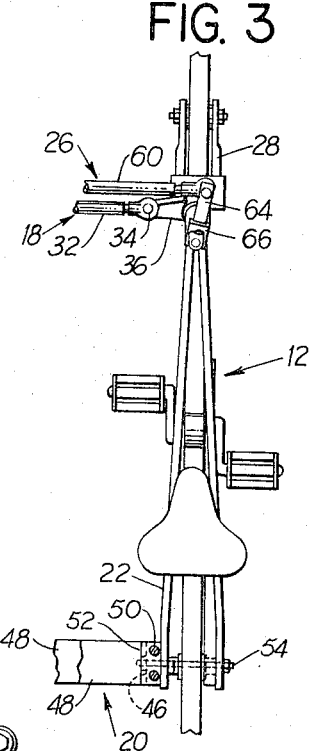
FIGURE 3 is a partial plan view of one of the coupled bicycles showing the coupling device attached thereto.

As a preferred or exemplary embodiment of the instant invention, FIGURES 1, 2 and 3 show a coupling device connecting two conventional bicycles, a girl's type 12 and a boy's type 14, in a side-by-side relation a convenient distance apart to form a coupled unit generally designated 16. It is understood, of course, that the coupled unit 16 may consist of two boy's type bicycles or two girl's type bicycles if desired. The coupling device includes a tie rod assembly 18 and a spring assembly 20 interconnecting the main frames 22 and 24 of the bicycles 12 and 14 respectively. Additionally, the coupling device includes a steering linkage assembly 26 interconnecting the front steering assemblies 28 and 30 of the bicycles 12 and 14 respectively. Preferably, each of the assemblies 18, 20 and 26 is detachably connected to the bicycles 12 and 14, as more fully hereinafter described, to permit the coupling device to be quickly removed and the bicycles used individually if desired.

The tie rod assembly 18 consists of a transversely disposed tie rod 32 having ends attached by swivel connectors 34 to arms 36 detachably connected to and transversely extending from the main frame tubes 38 and 40 which mount the front steering assemblies 28 and 30 of the bicycles 12 and 14 respectively. Any suitable means may be employed for detachably connecting the arms 36 to the tubes 38 and 40, the means shown in the drawings consisting of yokes 42 which are adapted to be firmly clamped to the tubes by means of the bolt and nut assemblies 44.

The spring assembly 20 includes two vertically disposed brackets 46 which are attached to the main frames 22 and 24 of the bicycles 12 and 14 respectively adjacent the rear wheels thereof. Two flat metal leaf springs 48 extending transversely between the bicycles 12 and 14 have ends which are attached to the upper and lower surfaces of the brackets 46 to form therewith a normally rectangular structure with the springs being disposed in a vertically spaced relation. The springs 48 are attached to the brackets 46 in any suitable manner which prevents the ends of the springs from moving relative to the brackets. In the preferred embodiment illustrated, screws 50 extending through holes in the ends of the springs 48 and threadably engaging aligned tapped holes in the brackets 46 firmly clamp the ends of the springs between the brackets and clamping plates 52.

The brackets 46 may be secured to the bicycle main frames 22 and 24 in any suitable manner which maintains the springs 48 in a substantially vertically spaced relation. In the embodiment shown, the extra long rear wheel axles 54 extend through the brackets 46 and are fastened thereto by nuts 56. In addition, bolt and nut assemblies 58 extending through aligned holes in the brackets 46 and adjacent portions of the frames 22 and 24 at points spaced from the axles 54 serve to rigidly connect the brackets to the bicycle main frames.

The springs 48 are relatively wide as compared to the thickness of the springs, with the width dimension extending substantially parallel to the longitudinal axes of the bicycles. Consequently, the spring assembly 20 functions as a rigid beam having a high resistance to bending in the direction of the longitudinal axes of the bicycles and, by virtue of the rigid attachment of the brackets 46 to the bicycle main frames 22 and 24, assures a constant relative lateral positioning of the bicycles 12 and 14. The tie rod assembly 18 is suitably dimensioned to assist in maintaining the bicycle main frames 22 and 24 in parallel alignment and thereby prevent excessive lateral bending forces from being exerted on the spring assembly 20. Normally, with the bicycles 12 and 14 resting on a level surface, the spring assembly 20 biases the bicycles to an upright position with the springs 48 straight and undistorted.

The front steering assemblies 28 and 30 of the bicycles 12 and 14 respectively are connected by the steering linkage assembly 26 which assures that the bicycles turn in unison. The steering linkage assembly 26 consists of a connecting bar 60 connected at its opposite ends by swivel connectors 62 to forwardly extending arms 64 adapted to be rigidly secured in any suitable manner to corresponding opposed portions of the bicycle steering assemblies 28 and 30.

In the embodiment shown, the arms 64 are attached to split clamps 66 adapted to be detachably and rigidly secured to the steering posts 68 of the respective bicycles. Preferably, the connecting bar 60 has a length such that the centerline distance between the swivel connectors 62 is greater than the transverse spacing between the longitudinal axes of the coupled bicycles 12 and 14. Also, the arms 64 are so secured to the posts 68 that they angle outwardly substantially the same amount when the front wheels of the coupled bicycles 12 and 14 are aligned with the longitudinal axes of the bicycles. The steering linkage assembly 26 constructed and mounted in the manner described has been found to result in greater ease of steering the coupled bicycles around curves, due to the fact that the front steering assembly of the inner bicycle, which must travel about a curve of lesser radius than the outer bicycle, is caused to have a greater angular deflection than the front steering assembly of the outer bicycle. Consequently, the coupled bicycles turn smoothly in unison, and tire wear is reduced by minimizing the forced skidding or sliding of one of the front tires when the coupled unit is traveling along a curved path.

It is readily apparent that with the improved coupling device of the present invention, two bicycles may readily be coupled or uncoupled for operation in unison or individually as may be desired. Due to the unique but simple construction of the coupling device, the coupled bicycles can be operated as a unit while still preserving to a substantial degree the feel and riding qualities of an individually operated bicycle. As shown in FIGS. 5 and 6, the coupling device permits one bicycle to move vertically relative to the other when the coupled bicycles are traveling over an uneven surface, and permits the bicycles to laterally incline or lean in unison when making a turn. These movements are achieved without creating and transmitting to the bicycle frames undesirable twisting or bending forces, or introducing any instability of relative movement, which would result in a ride and feel very much different from that experienced in a single bicycle operation.

The spring assembly 20 firmly maintains the lateral spacing between the coupled bicycles as well as preventing the bicycles from advancing or receding relative to one another. As can be readily seen from FIGS. 5 and 6, the vertically spaced springs 48 can readily flex in unison in the manner indicated to permit desired movement of the bicycles relative to one another in passing over obstructions or uneven surfaces or going around curves. At the same time, the spring assembly 20 minimizes the possibility of undesirable relative movements, such as tilting of the two bicycles towards each other, which would tend to introduce instabilities to the operation of the coupled unit.

While the coupled unit 16 has been shown and described with the tie rod assembly 18 and spring assembly 20 respectively connecting the front and rear portions of the bicycle main frames 22 and 24, it is to be understood that these assemblies may be reversed with the tie rod assembly 18 being rearwardly positioned and the spring assembly 20 forwardly positioned. In either case, operation of the coupled unit 16 will be as described and the coupling device will have the advantages over the prior art devices hereinbefore pointed out.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

I claim:

1. Apparatus for coupling two bicycles for simultaneous operation in spaced side-by-side relation comprising: a rigid spacer adapted to extend transversely between opposed frame members of said bicycles adjacent one end thereof, ends on said rigid spacer adapted to be hingedly connected to said frame members, a flexible spacer adapted to extend transversely between and be fixedly connected to opposed frame members of said bicycles adjacent the other end thereof, said rigid and flexible spacers having predetermined lengths adapted to cooperatively maintain said bicycles in spaced substantially parallel side-by-side relation, and steering linkage means adapted to interconnect the front wheels of said bicycles for simultaneous angular displacement thereof whereby said coupled bicycles are constrained to turn in unison, said flexible spacer comprising at least two spring members disposed in a vertically spaced relation, said spring members each having a high degree of bending rigidity in the direction of the longitudinal axes of said bicycles whereby the coupled bicycles are restrained from advancing or receding relative to each other and a high degree of bending flexibility in the direction substantially normal to the supporting surface of said bicycles whereby the coupled bicycles have freedom to move upwardly or downwardly relative to one another and to simultaneously incline transversely relative to the supporting surface, said flexible spacer being adapted to spring bias said coupled bicycles to the upright position.

2. The bicycle coupling apparatus as set forth in claim 1 wherein said spring members comprise flat metal springs having a realtively large dimension as measured in the direction of the longitudinal axes of said bicycles as compared to the dimension of said springs as measured in the direction substantially normal to the supporting surface.

3. The bicycle coupling apparatus set forth in claim 1 wherein said flexible spacer is adapted to be connected adjacent the forward ends of said bicycles.

4. The bicycle coupling apparatus set forth in claim 1 wherein said flexible spacer is adapted to be connected adjacent the rearward ends of said bicycles.

5. The bicycle coupling apparatus set forth in claim 1 wherein said steering linkage means comprises a lever adapted to be connected to and extend substantially forwardly from a steering mechanism of each of said bicycles, a tie bar, and means pivotally connecting each forwardly extending end of said levers to an end of said tie bar.

6. The bicycle coupling apparatus set forth in claim 5 wherein said pivotal connecting means are spaced apart by said tie bar a distance greater than the spacing between said bicycles which said rigid and flexible spacers are adapted to maintain.

7. The bicycle coupling apparatus set forth in claim 5 additionally including means for detachably connecting said rigid and flexible spacers to said bicycle frame members and means for detachably connecting said levers to said bicycle steering mechanisms.

8. Apparatus for coupling two bicycles for simultaneous operation in side-by-side relation comprising first bracket means adapted to be detachably connected to transversely opposed frame members of said bicycles adjacent one end thereof, second bracket means adapted to be detachably connected to transversely opposed frame members of said bicycles adjacent the other end thereof, rigid spacer means hingedly connected to each of said first bracket means, spring spacer means rigidly connected to each of said second bracket means, said rigid and spring spacer means being adapted to extend transversely of and cooperatively maintain said bicycles in spaced, substantially parallel side-by-side relation, said spring spacer means comprising a pair of flat metal springs disposed in a vertically spaced substantially parallel relation, said flat metal springs being substantially inflexible in the direction corresponding to the longitudinal axes of said bicycles whereby said spring spacer means is adapted to restrain the coupled bicycles from advancing or receding relative to one another, said flat metal springs being relatively flexible in the direction substantially normal to the supporting surface of said bicycles whereby the coupled bicycles are adapted to move upwardly or downwardly relative to one another and to simultaneously incline transversely relative to the supporting surface, said spring spacer means being adapted to spring bias the coupled bicycles to the upright position, and steering connecting means adapted to extend between and interconnect the steering mechanisms of said bicycles for simultaneous angular displacement thereof.

9. A pair of bicycles coupled together for simultaneous operation comprising a pair of bicycles each having frame means rotatably mounting a rear wheel and steering means pivotally connected to said frame means and rotatably mounting a front wheel, and means coupling said bicycles in side-by-side substantially parallel relation, said coupling means comprising a tie bar transversely disposed between said bicycles and having ends pivotally connected to opposed members of said frame means adjacent one end of said bicycles, spring means transversely disposed between said bicycles and connected to opposed members of said frame means adjacent the other end of said bicycles, said tie bar and spring means cooperatively maintaining said bicycles in spaced substantially parallel side-by-side relation with said spring means biasing said bicycles to a vertical position, and means interconnecting said bicycle steering means for moving said front wheels substantially in unison, said spring means comprising at least two spring members disposed in a vertically spaced relation, said spring members being substantially inflexible in the direction of the longitudinal axes of said bicycles whereby said bicycles are restrained from advancing or receding relative to each other, said spring members being readily flexible in the vertical direction whereby the coupled bicycles are able to move vertically relative to one another and to laterally incline in unison relative to the surface supporting the bicycles.

10. The coupled bicycles set forth in claim 9 wherein said spring members comprise flat metal springs having a relatively large width dimension as compared to the thickness thereof with said width dimension disposed substantially parallel to the longitudinal axes of said bicycles.

11. The coupled bicycles set forth in claim 9 wherein said spring means is disposed adjacent the rear wheels of said bicycles.

12. The coupled bicycles set forth in claim 9 wherein said means interconnecting said steering means comprises a lever connected to and extending substantially forwardly from said steering means of each of said bicycles and a connecting bar having ends pivotally attached to the forwardly extending ends of said levers, the length of said connecting bar between said pivotally attached ends being greater than the transverse spacing between the longitudinal axes of said bicycles maintained by said tie bar and spring means, said pivotally attached ends of said levers being transversely aligned and disposed outwardly substantially equal distances from the longitudinal axes of the associated bicycles when said front wheels of said bicycles are in substantial alignment with said longitudinal axes.

13. The coupled bicycles set forth in claim 12 additionally including means for detachably connecting said tie bar and said spring means to said frame means, and means for detachably connecting said levers to said steering means.

References Cited
UNITED STATES PATENTS

| 636,155 | 10/1899 | MacKay | 280—209 |
| 639,943 | 12/1899 | Schleicher | 280—209 |
| 2,248,223 | 7/1941 | Fellman et al. | 280—209 |
| 2,694,582 | 11/1954 | Reside | 280—209 |

KENNETH H. BETTS, *Primary Examiner.*